(12) United States Patent
Schmutzer et al.

(10) Patent No.: US 12,261,641 B2
(45) Date of Patent: Mar. 25, 2025

(54) DELAY MEASUREMENT FOR HYBRID PACKET AND OPTICAL TRANSPORT NETWORKS

(71) Applicant: Cisco Technology, Inc., San Jose, CA (US)

(72) Inventors: Christian Schmutzer, Koenigsbrunn im Weinviertel (AT); Luca Della Chiesa, Cesenatico (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 314 days.

(21) Appl. No.: 17/989,788

(22) Filed: Nov. 18, 2022

(65) Prior Publication Data

US 2024/0171271 A1 May 23, 2024

(51) Int. Cl.
*H04B 10/07* (2013.01)
*H04B 10/077* (2013.01)
(Continued)

(52) U.S. Cl.
CPC ........ *H04B 10/0775* (2013.01); *H04J 3/1664* (2013.01); *H04L 43/0852* (2013.01)

(58) Field of Classification Search
CPC .. H04B 10/0775; H04J 3/1664; H04J 3/1652; H04L 43/0852; H04L 43/106; H04L 43/0858
See application file for complete search history.

(56) References Cited

U.S. PATENT DOCUMENTS 10,038,494 B1 * 7/2018 Paraschis ............. H04B 10/032
2011/0164502 A1 * 7/2011 Mohan .................. H04L 43/08
370/236.2
(Continued)

FOREIGN PATENT DOCUMENTS

WO 2019047110 A1 3/2019

OTHER PUBLICATIONS

Mirsky G., et al., "RFC 8762 Simple Two-Way Active Measurement Protocol," Internet Engineering Task Force (IETF), https://www.rfc-editor.org/info/rfc8762, Mar. 2020, 15 pages.
(Continued)

*Primary Examiner* — Tanya T Motsinger
(74) *Attorney, Agent, or Firm* — Edell, Shapiro & Finnan, LLC

(57) ABSTRACT

A method is performed by a gateway node that is at a boundary of the first network domain and the second network domain. The method includes receiving an end-to-end delay measurement request sent by the first node to measure end-to-end delay between the first node and the second node. The end-to-end delay measurement request is configured to initiate a first delay measurement process configured for use in the first network domain. The gateway node sends to the second node a delay measurement request configured to initiate a second delay measurement process configured for use in the second network domain. The gateway node determines a delay measurement in the second network domain between the gateway node and the second node using the second delay measurement process. The gateway node sends to the first node an end-to-end delay measurement response that enables the first node to compute the end-to-end delay.

20 Claims, 8 Drawing Sheets

(51) Int. Cl.
*H04J 3/16* (2006.01)
*H04L 43/0852* (2022.01)

(56) References Cited

U.S. PATENT DOCUMENTS

| | | | | |
|---|---|---|---|---|
| 2012/0148248 A1* | 6/2012 | Li | | H04J 3/065 |
| | | | | 398/58 |
| 2012/0213508 A1* | 8/2012 | Moynihan | | H04J 3/0682 |
| | | | | 398/154 |
| 2012/0287778 A1* | 11/2012 | Saitoh | | H04L 41/0663 |
| | | | | 370/228 |
| 2014/0064722 A1 | 3/2014 | Losio et al. | | |
| 2014/0270754 A1 | 9/2014 | Loehr et al. | | |
| 2016/0315840 A1* | 10/2016 | Huang | | H04L 43/0864 |
| 2017/0104847 A1* | 4/2017 | Zhang | | H04L 67/63 |
| 2017/0195757 A1* | 7/2017 | Liou | | H04Q 11/0066 |
| 2018/0220210 A1* | 8/2018 | Paraschis | | H04Q 11/0071 |
| 2018/0262431 A1* | 9/2018 | Zhang | | H04L 47/20 |
| 2020/0382409 A1* | 12/2020 | Han | | H04L 43/0858 |
| 2021/0123798 A1* | 4/2021 | Wang | | H04L 45/00 |
| 2021/0203596 A1* | 7/2021 | Kini | | H04L 41/0816 |
| 2022/0124027 A1* | 4/2022 | Du | | H04L 45/42 |
| 2022/0321451 A1* | 10/2022 | Brissette | | H04L 45/04 |
| 2023/0006906 A1* | 1/2023 | Shu | | H04W 24/08 |
| 2023/0016213 A1* | 1/2023 | Bahl | | H04L 41/0894 |
| 2023/0261958 A1* | 8/2023 | Teslenko | | H04L 43/20 |
| | | | | 709/224 |
| 2024/0022467 A1* | 1/2024 | Schmutzer | | H04L 41/0654 |
| 2024/0028552 A1* | 1/2024 | Ohara | | G06F 15/17 |
| 2024/0031045 A1* | 1/2024 | Ohara | | H04B 17/364 |
| 2024/0187059 A1* | 6/2024 | Liu | | H04B 7/0802 |
| 2024/0340229 A1* | 10/2024 | Ma | | H04L 43/0858 |
| 2024/0365421 A1* | 10/2024 | Harmatos | | H04L 41/06 |

OTHER PUBLICATIONS

Hedayat, K., et al., "A Two-Way Active Measurement Protocol (TWAMP)," Network Working Group, https://www.rfc-editor.org/rfc/rfc5357.html, Oct. 2008, 26 pages.

Gandhi, R., et al., "Performance Measurement Using Simple TWAMP (STAMP) for Segment Routing Networks," draft-ietf-spring-stamp-srpm-04, https://datatracker.ietf.org/doc/draft-ietf-spring-stamp-srpm/04/, Jul. 2022, 28 pages.

Gringeri, S., et al., "Private Line Emulation over Packet Switched Networks," draft-schmutzer-pals-ple-00, https://datatracker.ietf.org/doc/draft-schmutzer-pals-ple/00/, Feb. 2022, 24 pages.

\* cited by examiner

DELAY MEASUREMENT FOR HYBRID PACKET AND OPTICAL TRANSPORT NETWORKS

TECHNICAL FIELD

The present disclosure relates to communication networks.

BACKGROUND

Latency of communication networks is becoming increasingly important in a world of hybrid cloud applications and the era of digitization. The ability to measure delay performance of networks is important for network operators in their efforts to comply with customer service level agreements with users.

Private line services are in high demand to address growing capacity requirements. Advances in packet switching silicon and Private Line Emulation (PLE) are enabling alternatives to Optical Transport Network (OTN) switching that naturally is leading to scenarios with hybrid network paths that traverse partially in an OTN and partially in a packet network (for PLE).

DETAILED DESCRIPTION

Overview

In one embodiment, techniques are provided for measuring end-to-end delay between a first node and a second node in a hybrid network environment that includes a first network domain of a first network type and a second network domain of a second network type. The first node may be part of the first network domain and the second node may be part of the second network domain. A method is provided that is performed by a gateway node that is at a boundary of the first network domain and the second network domain. The method includes receiving an end-to-end delay measurement request sent by the first node to measure end-to-end delay between the first node and the second node. The end-to-end delay measurement request is configured to initiate a first delay measurement process configured for use in the first network domain. The gateway node sends to the second node a delay measurement request configured to initiate a second delay measurement process configured for use in the second network domain. The gateway node determines a delay measurement in the second network domain between the gateway node and the second node using the second delay measurement process. Using the delay measurement in the second network domain, the gateway node sends to the first node an end-to-end delay measurement response that enables the first node to compute the end-to-end delay. In one example, the first network domain in which the first node that initiates the end-to-end delay measurement resides is a packet network domain and the second network domain in which the second node resides is an Optical Transport Network (OTN) domain. In another example, the first network domain in which the first node that initiates the end-to-end delay measurement resides is an OTN domain and the second network domain in which the second node resides is a packet network domain.

Example Embodiments

Figure 1:
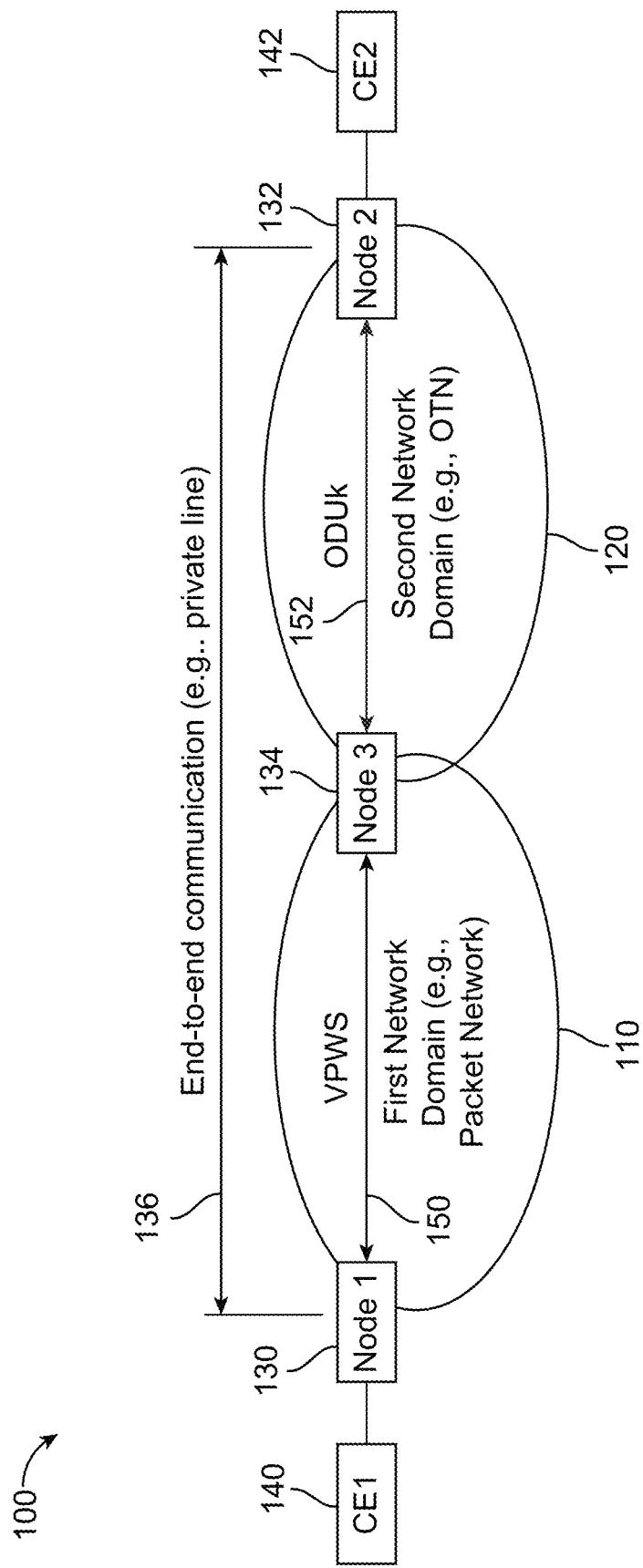
FIG. 1 is a high-level block diagram of a network environment in which techniques may be performed by a gateway node to perform end-to-end delay measurements in a hybrid network environment, according to an example embodiment.

With reference first to FIG. 1, there is shown a communication network environment 100 in which it is desired to measure end-to-end delay between a first node and a second node. The communication network environment 100 is a hybrid network environment that includes a first network domain 110 of a first network type and a second network domain 120 of a second network type. For example, the first network domain 110 employs a packet network communication technology, such as Multi-protocol Label Switching (MPLS) or Segment Routing version 6 (SRv6). The second network domain 120 may employ an optical network communication technology, such as Optical Transport Network (OTN) defined in various ITU Recommendations, such as G.709 and G.798. There is a first node 130 (Node 1) that is a part of the first network domain 110 and a second node 132 (Node 2) that is part of the second network domain 120. In addition, there is a gateway node 134 (Node 3) at a boundary of the first network domain 110 and the second network domain 120. Gateway node 134 is also referred to herein simply as node 134.

The first node 130 and the second node 132 are engaged in end-to-end connection 136 across the first network domain 110 and the second network domain 120. In one example, the end-to-end communication is a private line communication, such as PLE or native Ethernet Virtual Private Wire Service (VPWS) in the packet domain. There is a customer edge (CE) node 140 (CE1) connected to node 130 and a CE node 142 (CE2) connected to node 132. The end-to-end connection 136 may be achieved by stitching/interworking a pseudowire Virtual Private Wire Service (VPWS) 150 and ODUk circuit 152 together at the Node 134 that resides at the boundary of the first network domain 110 and second network domain 120.

Nodes 130 and 132 initiate a delay measurement without any knowledge of an intervening network domain of another type. Node 134 adjusts the delay measurement so that the measurement started from the left side (node 130) or the right side (node 132) can account for the end-to-end delay completely. Node 134 serves as proxy for the delay measurements made in the "other" network (that the initiating node does not understand or even know is there) based on the delay request coming from node 130 or node 132. Node 130 may not know that node 134 is different, and also does not know that Node 134 exists. As to node 130, the fact that a portion of the delay measurement is made in the second network domain (e.g., OTN) is completely transparent to node 130 due to the operations that node 134 performs.

Figure 2:
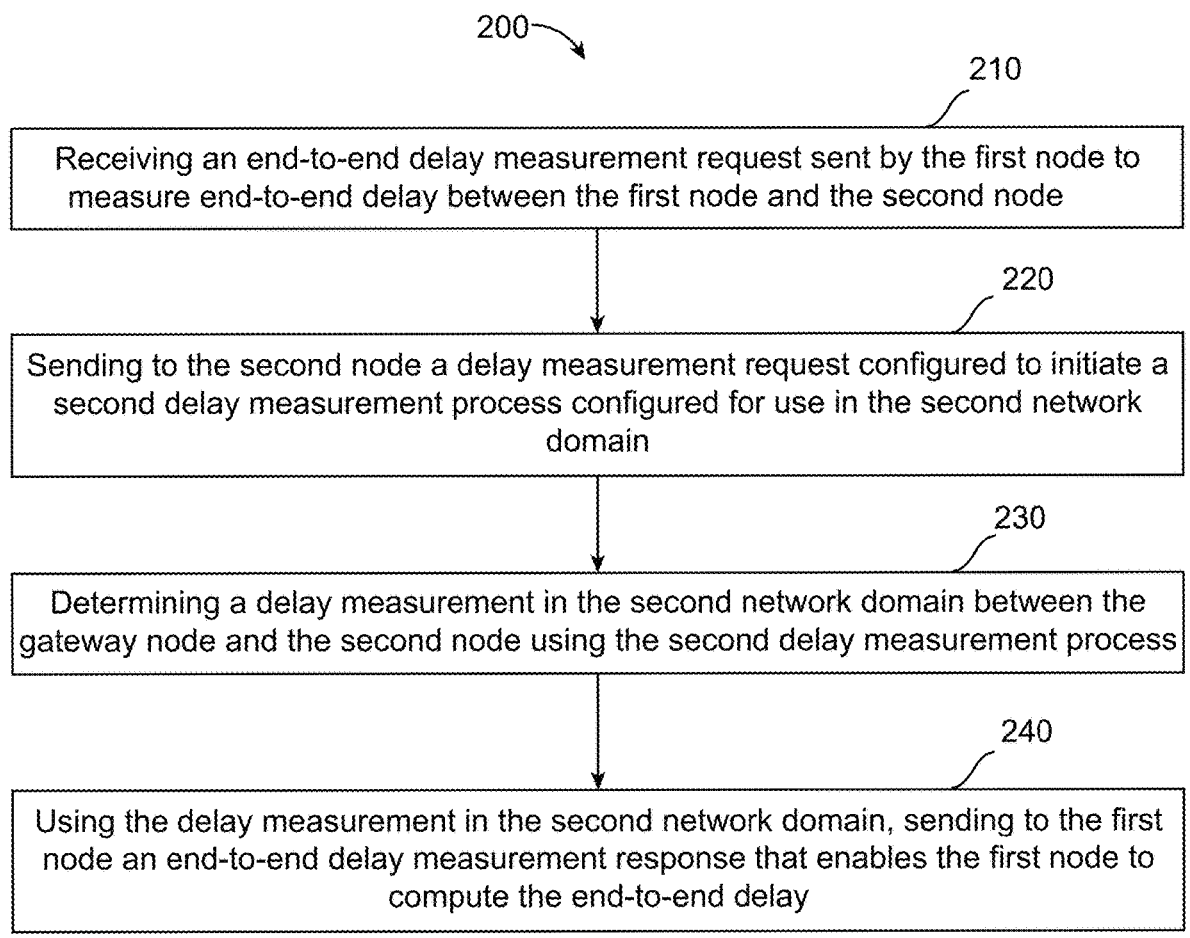
FIG. 2 is a flow chart depicting, at a high-level, operations of the techniques for performing end-to-end delay measurements in a hybrid network environment, according to an example embodiment.

Turning now to FIG. 2, a flow chart is now described that depicts, at a high-level, a method 200 for measuring end-to-end delay between a first node and a second node in a hybrid network environment that includes a first network domain of a first network type and a second network domain of a second network type. As depicted in FIG. 1, the first node is a part of the first network domain and the second node is a part of the second network domain. The method 200 may be performed by a gateway node (e.g., node 134 in FIG. 1) that is at a boundary of the first network domain and the second network domain. At step 210, the method 200 involves receiving an end-to-end delay measurement request sent by the first node to measure end-to-end delay between the first node and the second node. The end-to-end delay measurement request is configured to initiate a first delay measurement process configured for use in the first network domain. The first node may have no knowledge of the second network domain. At step 220, the method 200 involves sending to the second node a delay measurement request configured to initiate a second delay measurement process configured for use in the second network domain. Again, the first node has no knowledge of the second delay measurement process used to measure delay in the second network domain. At step 230, the method 200 involves determining a delay measurement in the second network domain between the gateway node and the second node using the second delay measurement process. Lastly, at step 240, the method 200 involves using the delay measurement in the second network domain, sending to the first node an end-to-end delay measurement response that enables the first node to compute the end-to-end delay.

Figure 3A:
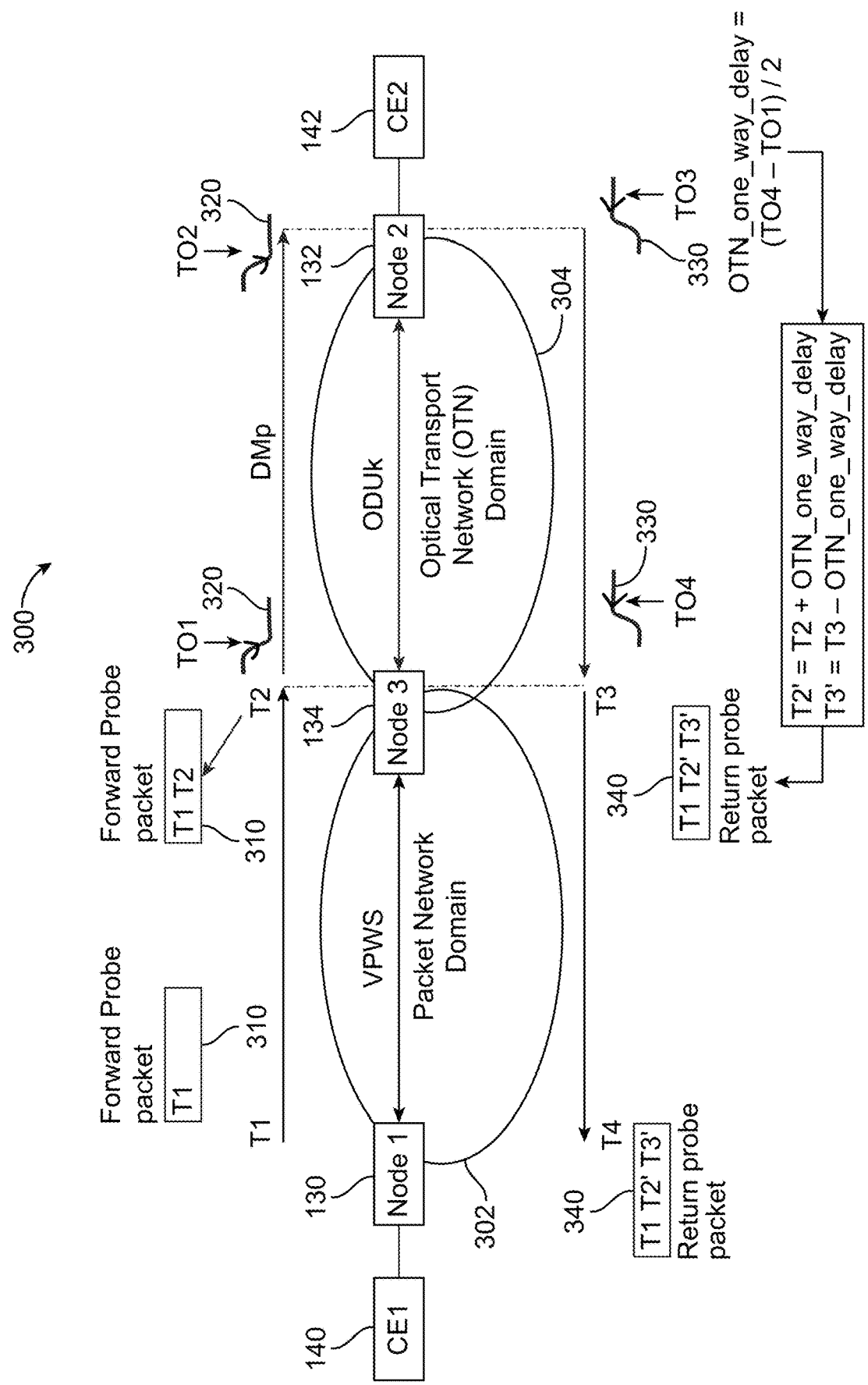
FIG. 3A is a diagram similar to FIG. 1, and illustrating a process for performing end-to-end delay measurements in a hybrid network environment including a packet network domain and an Optical Transport Network (OTN) domain and the node initiating the delay measurement is in the packet network domain, according to an example embodiment.
Figure 3B:
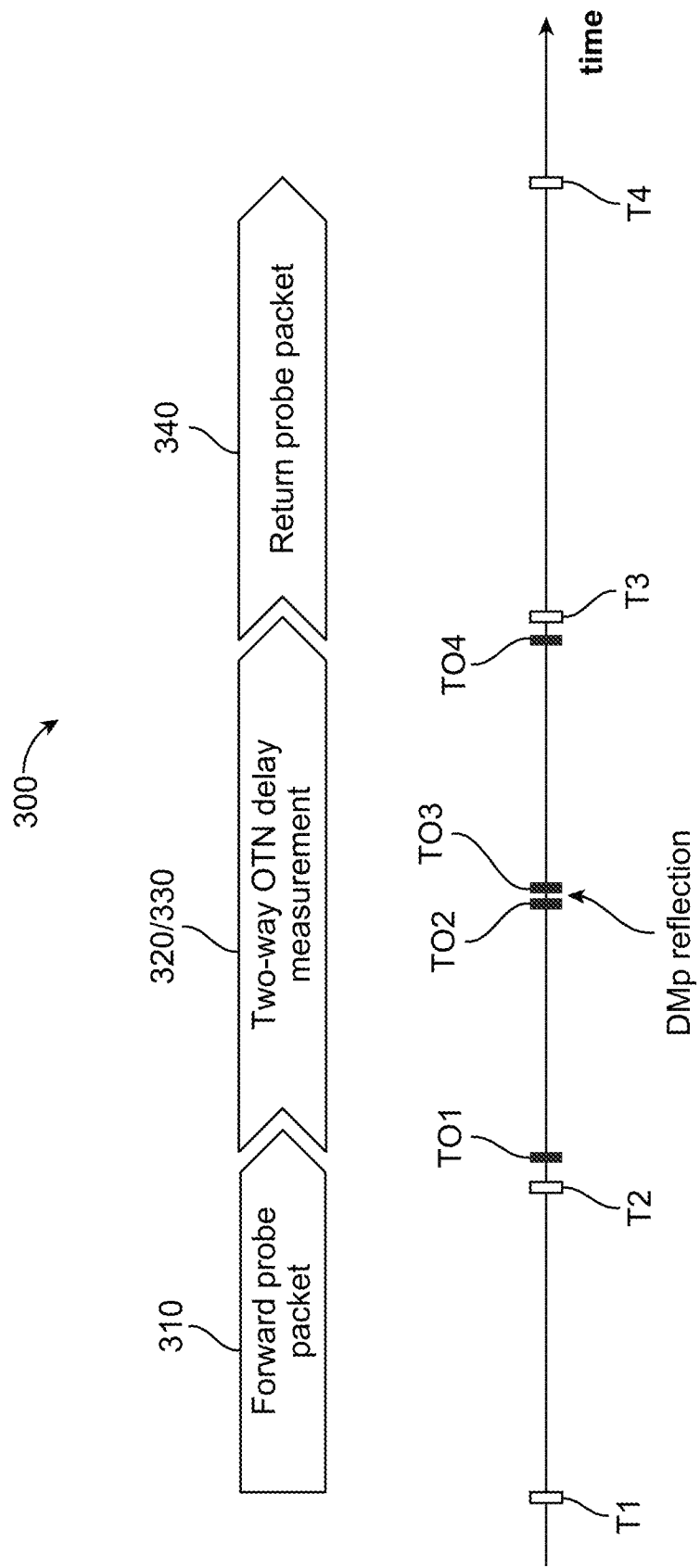
FIG. 3B is a timing diagram associated with the process of FIG. 3A, according to an example embodiment.

As explained above, in one example, the first network type is a packet network and the second network type is an Optical Transport Network (OTN). In this case, the end-to-end delay measurement request is a forward probe packet and the end-to-end delay measurement response is a return probe packet. To this end, reference is now made to FIGS. 3A and 3B. These figures illustrate a process 300 in which the node 130, at the edge of the packet network domain 302 (packet network), initiates a delay measurement request with respect to node 132 that is at the edge of an OTN domain 304. FIG. 3A illustrates the process 300 in terms of packet exchanges in the packet network domain 302 and frame exchanges in the OTN domain 304, and FIG. 3B illustrates the process 300 in a timeline format.

In the process 300, node 130 sends a delay measurement request in the form of a forward probe packet 310 to node 132. Node 134 receives the forward probe packet 310 (intercepting the forward probe packet 310), captures the timestamp T2 and instead of immediately sending a return probe packet back to node 130, node 134 launches an OTN delay measurement in OTN domain 304 towards node 132. Node 134 implicitly knows when to perform a different delay measurement process in another network domain because node 134 performs "stitching" operations between network domains. In the example of FIGS. 3A and 3B, the OTN delay measurement involves invoking the delay measurement procedures of ITU-T specifications of G.708 and G.709 (Delay Measurement bit (DMp) bit). Normally, node 132, if it were a packet node, would simply add the timestamp T2 representing the time when the forward probe packet arrives at node 132 and timestamp T3 when the return probe leaves node 132 back towards node 130. Instead, node 134 adjusts timestamps T2 and T3 of the return probe packet sent to node 130 to account for the delay in the OTN domain 304. In so doing, the packet delay measurement process "feels like" the probe packet travelled all the way to node 132 and back, i.e. a full end-to-end measurement was performed.

The new values for T2 and T3 are denoted T2' and T3', respectively. Time T2' is also referred to herein as the proxied or "faked" time of arrival representing arrival of the forward probe packet 310 at node 132. Similarly, T3' is also referred to herein as the proxied or "faked" time of transmission/departure representing transmission of a return probe packet, described below, by the node 132 towards node 130. In other words, time T3' is the proxied representation of when node 132, if it were a packet node, would send a probe response packet back to node 130, and time T4 is the time when node 130 receives that response probe packet.

More specifically, at time T1, node 130 sends a forward probe packet 310 towards node 132. Again, node 130 may not be aware of node 134. Node 130 may include timestamp data indicating time T1 in the forward probe packet 310, but it should be noted that it is not required that node 130 include data for time T1 in the forward probe packet 310 since node 130 will likely store that data for later use in computing roundtrip (two-way) delay, but including timestamp date for T1 is useful to enable the peer node (node 132) to compute one-way delay. Node 134 receives the probe packet 310 at time T2. That is, time T2 is when the "other side" receives the forward probe packet 310, which is when node 134 receives forward probe packet 310. The forward probe packet 310 never reaches node 132.

When node 134 receives the forward probe packet 310, it adjusts the delay measurement to account for the end-to-end delay by initiating a delay measurement in the OTN domain 304, as described in more detail below. Node 134 serves as proxy for the delay measurements made in OTN domain 304 and node 130 does not understand or even know about the OTN domain 304. In other words, node 130 does not know that node 132 is in a different type of network domain. As to node 130, the fact that a portion of the end-to-end delay measurement is made in the OTN domain is completely transparent to node 130 due to the operations that node 134 performs. Again, a new time is defined, called time T2', which is the proxied or "faked" time of when the forward probe packet 310 would arrive at node 132, but the forward probe packet 310 never reaches node 132.

At time TO1, node 134 initiates a measurement in the OTN domain 304 to determine the one-way delay in the OTN domain 304. Node 134 generates and transmits a forward OTN frame 320 (e.g., an ODUk frame) in which it toggles a DM bit in an overhead portion of the forward OTN frame 320 and provisions node 132 to be a responder for an OTN delay measurement. At time TO2, node 132 receives the forward OTN frame 320 and because it sees a change in the DM bit of the forward OTN frame 320, node 132 has to change/toggle, within a predetermined period of time, e.g.

100 microseconds, the DM bit in a return OTN frame. At time TO3, node 132 sends a return OTN frame 330 to node 134 with the DM bit toggled, and at time TO4, node 134 receives the return OTN frame 330 with the DM bit toggled.

Node 132 can compute the one-way delay and two-way delay in the OTN domain 304 by computing:

OTN_two_way_delay=$TO4-TO1$

OTN_one_way_delay=OTN_two_way_delay/2

In so doing, node 134 is measuring the time between when it changed the DM bit and the time it receives the reflected back change from node 132, to determine the delay in the OTN domain 304.

Node 134 can then compute time T2' and time T3' as:

$T2'=T2$+OTN_one_way_delay $T3'=T3$−OTN_one_way_delay

Again, T2' is the proxied or faked time that the forward probe packet 310 would have arrived at node 132, taking into account the one-way delay in the OTN domain 304. Similarly, T3' is the proxied or fake time when node 132 would have sent a return (response) probe packet to the probe packet 310 back to node 130, where T3 is the time that node 134 sends the return probe packet. Thus, node 134 sends a return probe packet 340 and includes in the return probe packet 340 data for T2' and for T3'.

The end-to-end two-way delay may then be computed according to the computation:

end-to-end two-way delay=$(T2'-T1)+(T4-T3')$ where the forward delay is (T2'−T1) and the reverse/backward delay is T4−T3'.

Figure 4A:
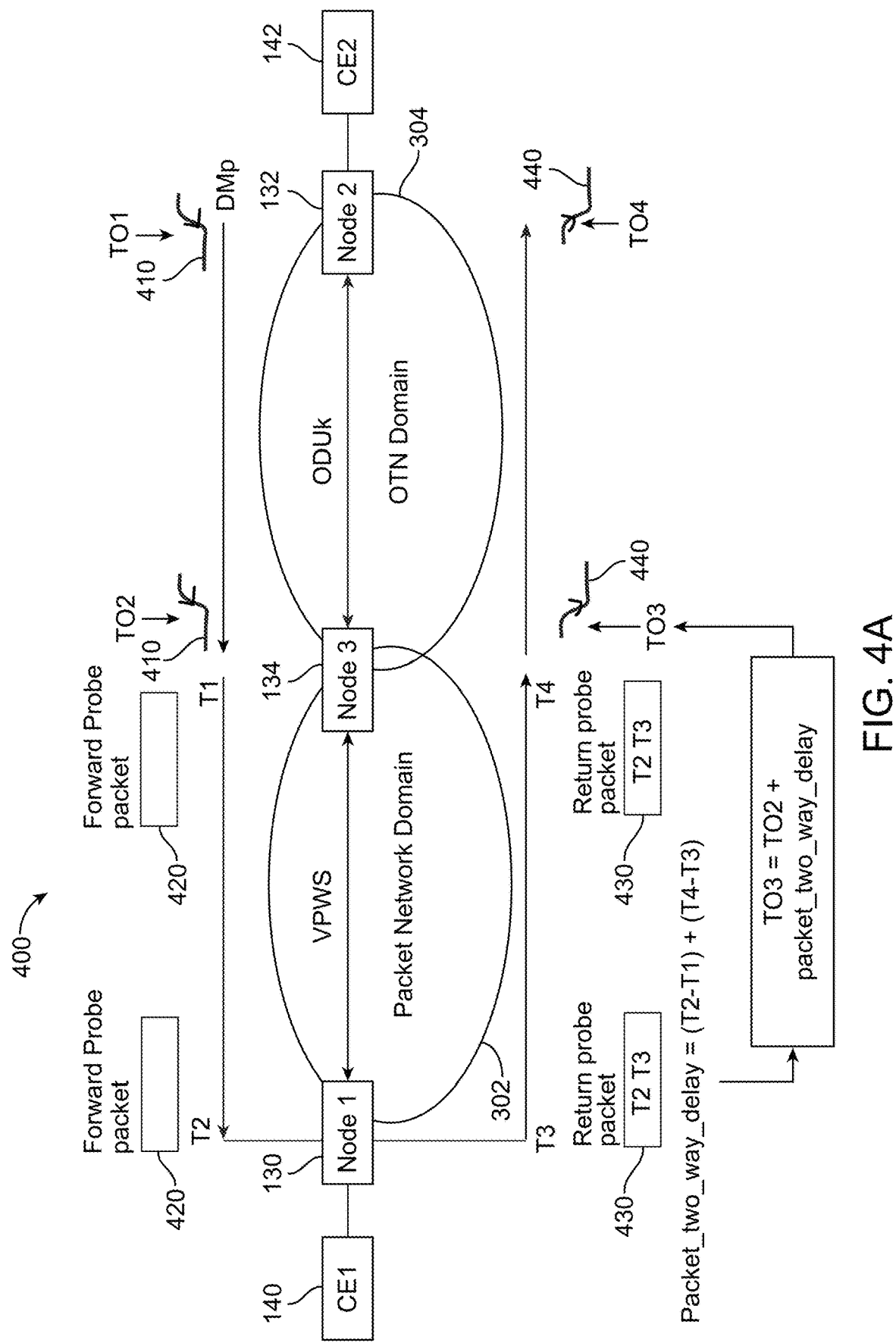
FIG. 4A is a diagram similar to FIG. 1, and illustrating a process for performing end-to-end delay measurements in a hybrid network environment including a packet network domain and an Optical Transport Network (OTN) domain and the node initiating the delay measurement is in the OTN domain, according to an example embodiment.
Figure 4B:
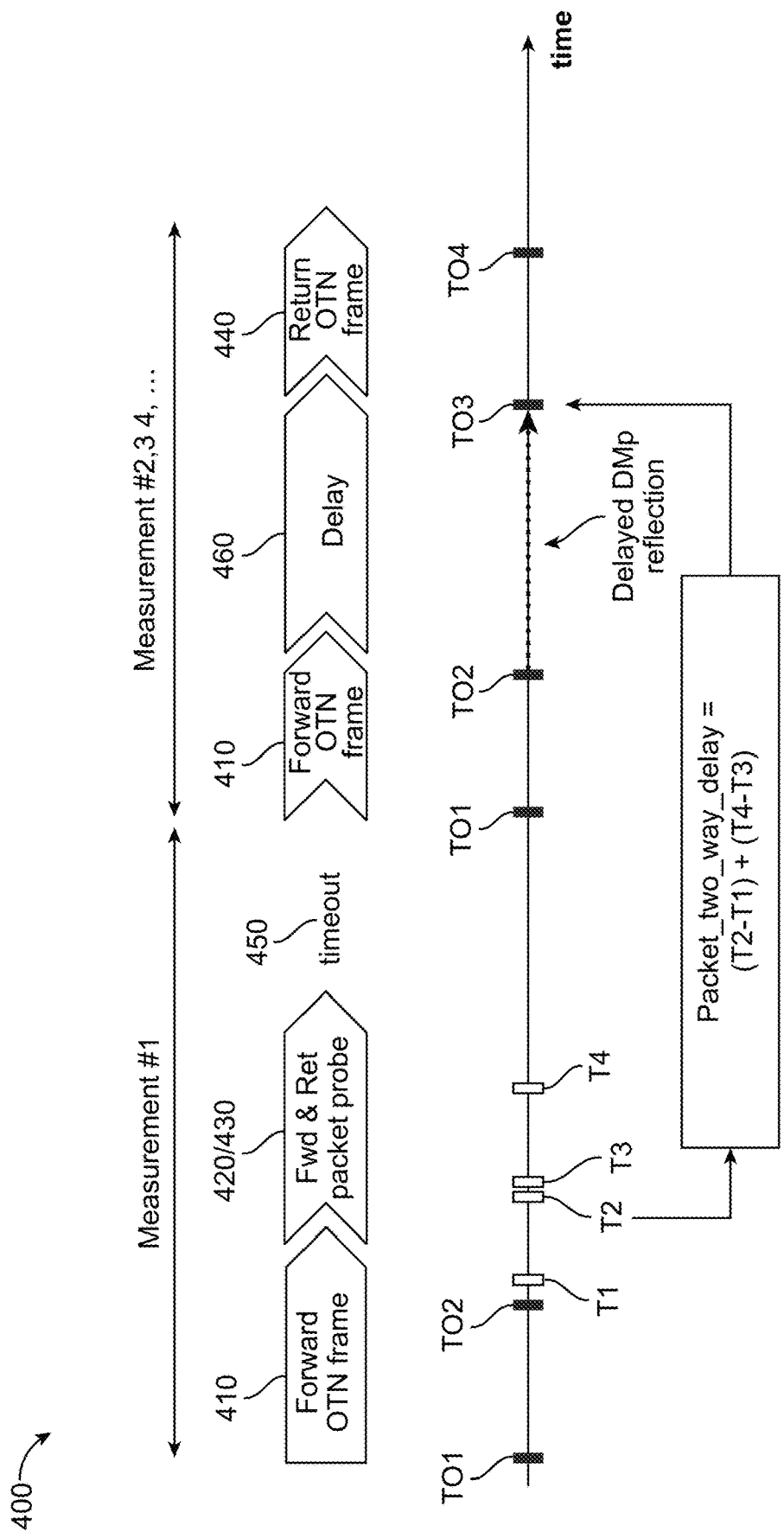
FIG. 4B is a timing diagram associated with the process of FIG. 4A, according to an example embodiment.

Reference is now made to FIGS. 4A and 4B. These figures depict a process 400 by which the delay measurement is initiated from the OTN endpoint, node 132, in the OTN domain 304 to node 130 in the packet network domain 302. Like FIGS. 3A and 3B, FIG. 4A illustrates the process 400 in terms of packet and frame exchanges in the network domains and FIG. 4B illustrates the process 400 in a timeline format.

Node 132 initiates a delay measurement towards node 130 by sending, at time TO1, a forward OTN frame 410 with a DM bit toggled. Node 132 may not know about the packet network. At time TO2, node 134 receives the forward OTN frame 410. Normally, node 134 would be responsible for promptly toggling/flipping the DM bit in a return OTN frame sent back to node 132, within a predetermined period of time, e.g., 100 microsecs, and then sending the return OTN frame to node 132. Instead, node 134 triggers a forward probe packet 420 to node 130, and receives a return probe packet 430 to measure the two-way delay in the packet network domain 302, using times T1, T2, T3 and T4, where time T1 is the time node 134 sends the forward probe packet 420, time T2 is the time node 130 receives the forward probe packet 420, time T3 is the time node 130 sends the return probe packet and time T4 is the time node 134 receives the return probe packet. Node 130 includes time T2 and time T3 in the return probe packet 430.

Node 134 computes the two-way delay in the packet network domain 302 as:

packet_two_way_delay=$(T2-T1)+(T4-T3)$

Node 134 uses the packet two-way delay associated with the packet network domain 302 to delay the sending of the return OTN frame (with the DM bit toggled) to node 132 so that the delay measured/observed at node 132 includes the delay in the packet network domain 302 as well as the delay in the OTN domain 304. Thus, the time TO3, which corresponds to when the node 134 sends the return OTN frame 440 back to node 132 with the DM bit toggled, is computed as the time TO2 (the time that node 134 receives the forward OTN frame 410 from node 132) plus the packet packet_two_way_delay, thereby taking into account the delay in the packet network domain 302.

In this example, node 134 does intentionally not reflect the return OTN frame (with the DM bit toggled) back to node 132 immediately because it first determines the delay in the packet network. As a consequence, the state of the DM bit in return OTN frames to node 132 does not change in sufficient time and the OTN delay measurement process times-out.

The delay measurement process in the OTN domain 304 will retry and/or collect multiple measurements. When the next OTN measurement attempt is made by node 132, node 134 receives the subsequent forward OTN frame (with the DM bit toggled) and can delay the response OTN frame (with reflection of the DM bit toggled) in response to that subsequent forward OTN frame, and then have a good measurement for node 132. In other words, node 134 forces a drop of the first OTN delay measurement frame attempt because node 134 could not yet obtain the packet network domain delay measurement. Node 134 delays the return of the OTN frame by an amount equal to the packet network domain delay (packet_two_way_delay) when it next receives a forward OTN frame with a DM bit toggled corresponding to the next OTN delay measurement attempt from node 132. This is shown in FIG. 4B, where a timeout 450 occurs after the delay measurement in the packet network domain, but before that delay measurement can be incorporated into the return OTN frame 440 to be sent back to node 132 in response to the forward OTN frame 410 that initiated the end-to-end delay measurement between node 132 and node 130. Thus, after the timeout 450, node 132 will send another forward OTN frame 410 to initiate an end-to-end delay measurement. At this point, node 134 has completed the delay measurement in the packet network domain 302 and knows how long to apply a delay 460 (equal to the packet_two_way_delay referred to above) before sending, at time TO3, the OTN frame 440 to node 130. It is to be understood that node 134 could be continuously measuring packet network delay with node 130 in the packet network domain 302 and thus may have that information (packet_two_way_delay) already at the time node 134 receives a first forward OTN frame 410 from node 132, and thus can promptly send a return OTN frame 440 (with the appropriate delay) back to node 132, without a timeout occurring and waiting for another forward OTN frame 410 from node 132. At some point, if no DM bit toggle happens on the OTN side, node 134 would stop sending delay measurement probes in the packet network domain 302 (serving as an idle timeout), and whenever a DM bit toggle happens on the OTN domain side, the delay measurement process is restarted.

Node 132 can compute the end-to-end two-way delay as:

end-to-end two way delay=$TO4-TO1$

Node 132 can also compute the forward delay and reverse delay as:

forward_delay=end-to-end_two_way_delay/2 reverse_delay=end-to-end_two_way_delay/2

As described above, it is desirable to have a seamless end-to-end connection between two nodes, even when parts of that network connection are in different types of networks, e.g., a packet network and an OTN. It is desirable to be able to measure end-to-end delay without placing any additional burden on an external network management system to understand the details of the different network types that the traffic passes through (e.g., a packet network and an OTN).

The techniques presented herein involve "stitching" together a delay measurement made in two or more different types of network domains, e.g., in a OTN domain where delay measurements are made using a delay measurement process that is based on a bit being toggled in an overhead area of an OTN frame and in a packet network domain where a delay measurement process involves using timestamps in probe packets or other packets. These techniques do not rely on any special knowledge at the endpoint devices (nodes) between which the end-to-end delay is being measured. The intelligence/capability resides in the gateway node (e.g., node 134) and the translation operations that this gateway node performs is transparent to the endpoint devices. This makes adoption of these techniques easier than having to provide special capabilities in endpoint devices. The hybrid delay measurement techniques/capability may be enabled or disabled on the gateway node, e.g., node 134, as desired. If the capability is disabled, the delay measurements will be per network domain, and if enabled, the measurements will by end-to-end leveraging these hybrid delay measurement techniques.

The techniques presented herein allow for end-to-end delay measurement across a hybrid network environment that partially lives in a first network domain (e.g., a packet network domain) and partially in a second network domain (e.g., an OTN domain). Measurement can be triggered from either endpoint without any special capabilities imposed on the endpoints and without a network management/automation system triggering the measurement.

Figure 5:
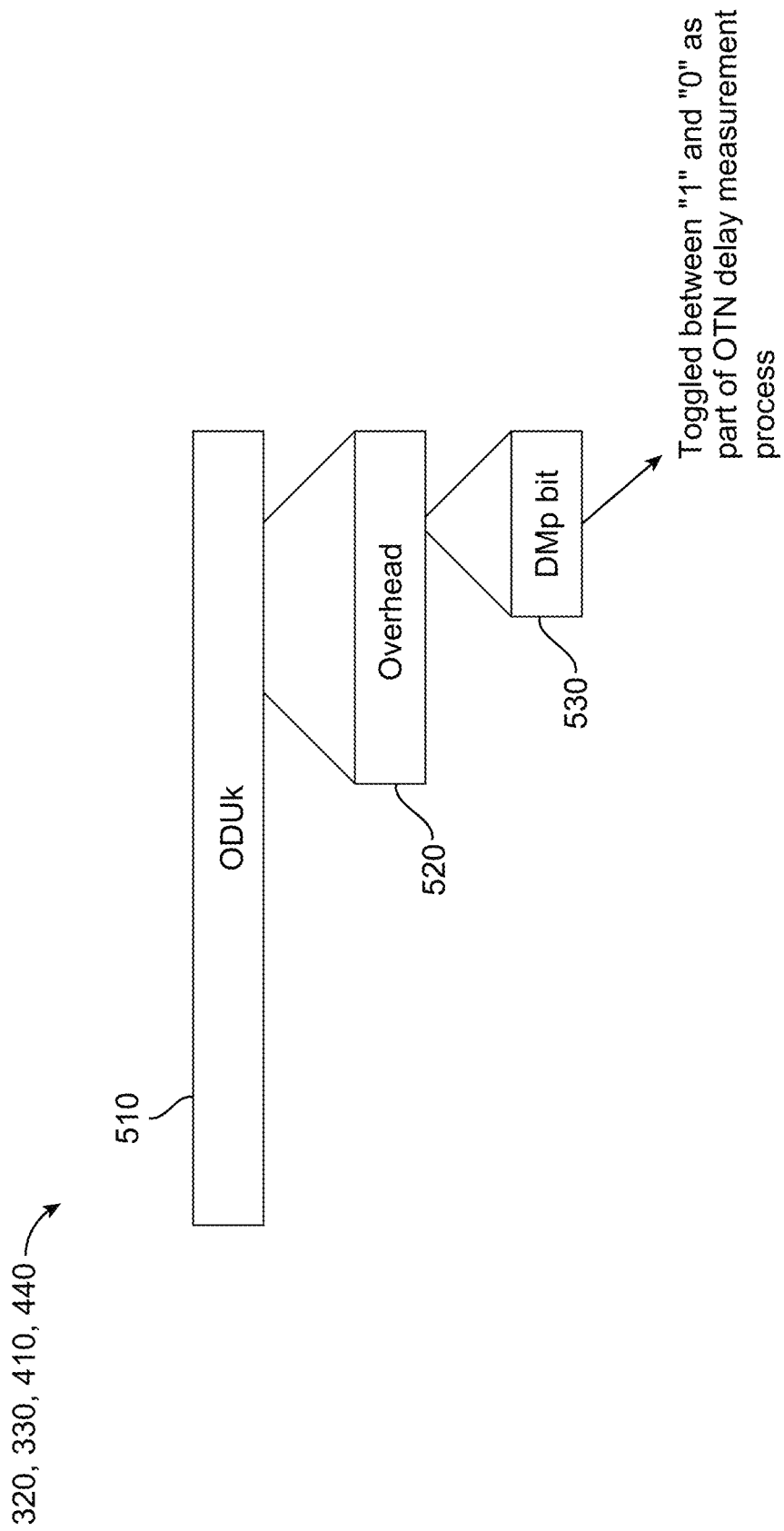
FIG. 5 is a diagram of an OTN frame that includes a bit in a field of an overhead portion to signify a delay measurement process in the OTN domain, according to an example embodiment.

Reference is now made to FIG. 5. FIG. 5 illustrates an example high-level diagram of an OTN frame that is part of the OTN delay measurement processes depicted in FIGS. 3A, 3B, 4A and 4B. The frame structure shown in FIG. 5 is representative of the forward OTN frame 320 and return OTN frame 330 shown in FIGS. 3A and 3B as well as the forward OTN frame 410 and return OTN frame 440 shown in FIGS. 4A and 4B. These frames may take the form of an ODUk frame 510 that includes an overhead portion 520. In the overhead portion 520, there is a one-bit field reserved for an OTN delay measurement, called the DM bit field 530, as described above. It is the value of this one-bit field that is toggled to signify that the OTN frame is associated with a delay measurement process in the OTN domain. These techniques are described in more detail in the ITU-T G.798 specification document, Amendment 2, published December 2019, and entitled "Series G: Transmission Systems and Media, digital Systems and Networks, Characteristics of Optical Transport Network Hierarchy Equipment Functional Blocks."

Figure 6:
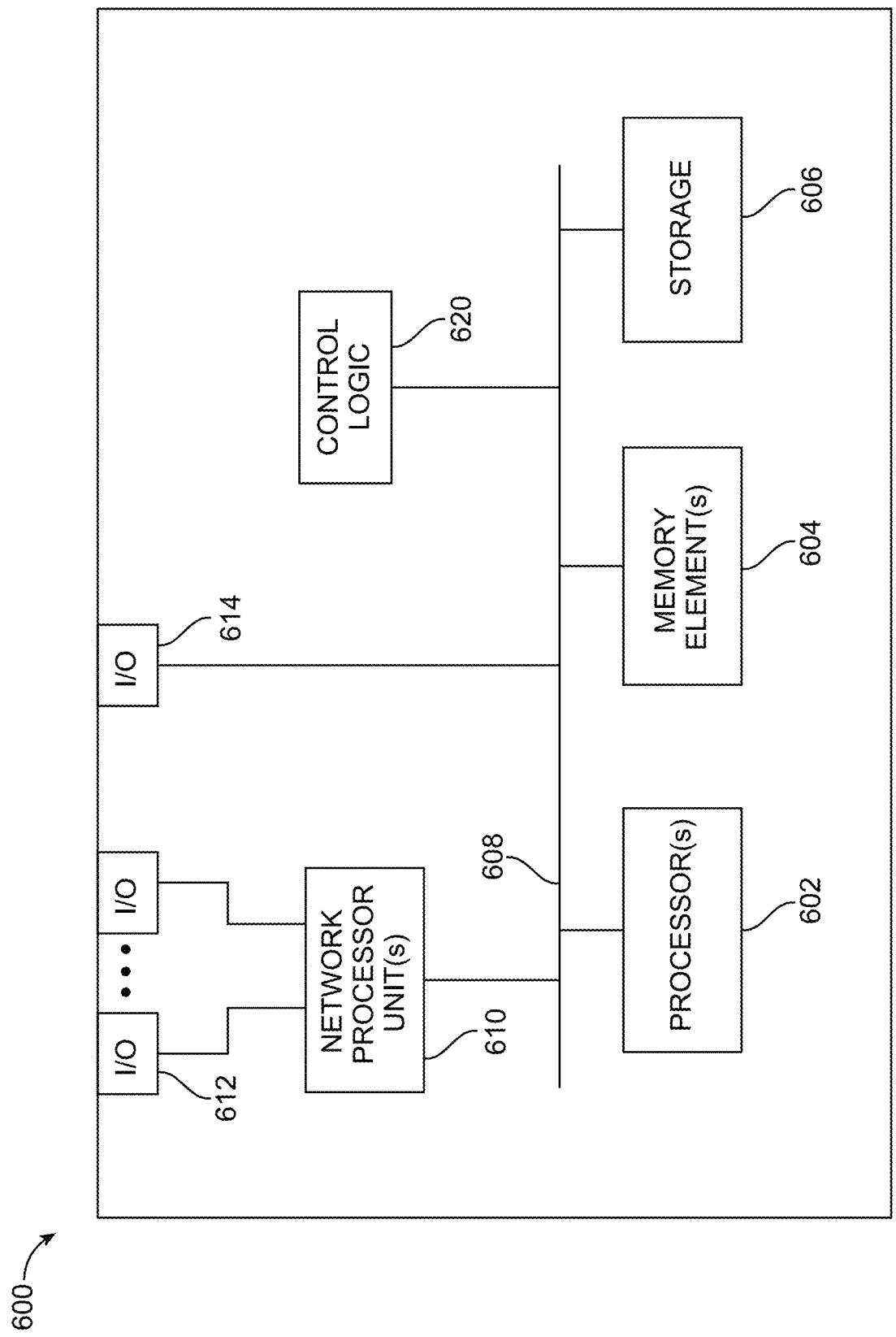
FIG. 6 is a hardware block diagram of a device that may be configured to perform the operations involved in the techniques presented herein, according to an example embodiment.

Referring to FIG. 6, FIG. 6 illustrates a hardware block diagram of a device 600 that may perform functions of a device associated with operations discussed herein in connection with the techniques depicted in FIGS. 1, 2, 3A, 3B, 4A, 4B, and 5. In various embodiments, device 600 may be configured as any devices, e.g., node 134, as discussed for the techniques depicted in connection with FIGS. 2, 3A, 3B, 4A, 4B, and 5 in order to perform operations of the various techniques discussed herein. The device 600 may be representative of the gateway node 134, whose operations are described above in connection with FIGS. 2, 3A, 3B, 4A, 4B, and 5.

In at least one embodiment, the device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for device 600 can overlap in any manner and are not limited to the specific allocation of instructions and/or operations described herein. The one or more network I/O interfaces 612 are configured to enable network communication on behalf of a node, e.g., node 134, in a hybrid network environment that includes a first network domain of a first network type and a second network domain of a second network type, wherein the node is at a boundary of the first network domain and the second network domain. For example, the one or more network I/O interfaces 612 include network I/O interfaces with capabilities to enable physical layer network communication in a packet network and network I/O interfaces with capabilities to enable physical layer network communication in an OTN. Likewise, the one or more network processor units 610 are configured to perform the various baseband modulation and carrier modulation (e.g., optical modulation) for both packet domain network communication and OTN domain network communication. The one or more network processor units 610 may include various arrangement of line cards, pluggable optical modules, application specific integrated circuits, and other devices known in the art to enable packet domain network communications and OTN domain network communications, for example.

In at least one embodiment, processor(s) 602 is/are at least one hardware processor configured to execute various tasks, operations and/or functions for device 600 as described herein according to software and/or instructions configured for device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with device 600, and/or logic configured for memory element(s) 604 and/or storage 606. For example, any logic described herein (e.g., control logic 620) can, in various embodiments, be stored for device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of device 600 to communicate in order to exchange information and/or data. Bus 608 can be implemented with any architecture designed for passing control, data and/or information between processors, memory elements/storage, peripheral devices, and/or any other hardware and/or software components that may be configured for device 600. In at least one embodiment, bus 608 may be implemented as a fast kernelhosted interconnect, potentially using shared memory between processes (e.g., logic), which can enable efficient communication paths between the processes.

In various embodiments, network processor unit(s) 610 may enable communication between device 600 and other systems, entities, etc., via network I/O interface(s) 612 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to device 600. For example, I/O interface(s) 614 may provide a connection to external devices such as a keyboard, keypad, mouse, display, a touch screen display, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, particularly when the device 600 serves as a user device as described herein.

In various embodiments, control logic 620 can include instructions that, when executed, cause processor(s) 602 to perform operations, which can include, but not be limited to, providing overall control operations of device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to conduct operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a device for transfer onto another computer readable storage medium.

In some aspects, the techniques described herein relate to a method for measuring end-to-end delay between a first node and a second node in a hybrid network environment that includes a first network domain of a first network type and a second network domain of a second network type, the first node being a part of the first network domain and the second node being a part of the second network domain, the method performed by a gateway node that is at a boundary of the first network domain and the second network domain, the method including: receiving an end-to-end delay measurement request sent by the first node to measure end-to-end delay between the first node and the second node, the end-to-end delay measurement request configured to initiate a first delay measurement process configured for use in the first network domain; sending to the second node a delay measurement request configured to initiate a second delay measurement process configured for use in the second network domain; determining a delay measurement in the second network domain between the gateway node and the second node using the second delay measurement process; and using the delay measurement in the second network domain, sending to the first node an end-to-end delay measurement response that enables the first node to compute the end-to-end delay.

In some aspects, the techniques described herein relate to a method, wherein the first network type is a packet network and the second network type is an Optical Transport Network (OTN), and wherein the end-to-end delay measurement request is a forward probe packet and the end-to-end delay measurement response is a return probe packet.

In some aspects, the techniques described herein relate to a method, further including: computing a proxied time of arrival representing arrival of the end-to-end delay measurement request at the second node based on the delay measurement in the second network domain; computing a proxied time of transmission representing transmission of the end-to-end delay measurement response by the second node to the first node based on the delay measurement in the second network domain; and including the proxied time of arrival and the proxied time of transmission in the end-to-end delay measurement response sent to the first node.

In some aspects, the techniques described herein relate to a method, wherein: sending to the second node the delay measurement request includes sending a forward OTN frame in which a delay measurement bit in an overhead area of the forward OTN frame is toggled; and determining the delay measurement in the second network domain includes measuring an interval of time between sending the forward OTN frame to the second node and receiving a return OTN frame from the second node in which the delay measurement bit has been toggled.

In some aspects, the techniques described herein relate to a method, wherein the first network type is an Optical Transport Network (OTN) and the second network type is a packet network, wherein the end-to-end delay measurement request is a forward OTN frame in which a delay measurement bit is toggled in an overhead area of the forward OTN frame.

In some aspects, the techniques described herein relate to a method, wherein: sending to the second node the delay measurement request includes sending a probe request packet; determining the delay measurement in the second network domain includes determining a two-way delay in the packet network between the gateway node and the second node based on time of transmission of the probe request packet and time of arrival of a probe response packet from the second node; and using the delay measurement in the second network domain for sending the end-to-end delay measurement response includes delaying, by an amount of time based on the two-way delay in the packet network, sending to the first node of a return OTN frame in which a delay measurement bit is toggled in the overhead area of the return OTN frame.

In some aspects, the techniques described herein relate to a method, wherein the forward OTN frame received at the gateway node in which the delay measurement bit is toggled to serve as the end-to-end delay measurement request is a first forward OTN frame, and when a timeout occurs by which the return OTN frame is to be sent to the first node in response to the first forward OTN frame before the two-way delay in the packet network is determined, sending of the return OTN frame is performed in response to receiving by the gateway node of a subsequent forward OTN frame with the delay measurement bit toggled from the first node.

In some aspects, the techniques described herein relate to a method, further including: continuously performing sending to the second node the probe request packet and receiving the probe response packet from the second node to determine the delay measurement in the second network domain, wherein sending to the first node the return OTN frame is performed in response to receiving the first forward OTN frame, prior to the timeout, when the delay measurement in the second network domain is available at the gateway node based on the continuously performing.

In some aspects, the techniques described herein relate to an apparatus including: one or more network interfaces configured to enable network communication on behalf of a gateway node in a hybrid network environment that includes a first network domain of a first network type and a second network domain of a second network type, the gateway node being at a boundary of the first network domain and the second network domain; and one or more network processors coupled to the one or more network interfaces to send and receive network communications in the first network domain and in the second network domain; a control processor coupled to the one or more network processors, the control processor configured to perform operations including: obtain an end-to-end delay measurement request received by the one or more network processors that is sent by a first node in the first network domain to measure end-to-end delay between the first node and a second node in the second network domain, the end-to-end delay measurement request configured to initiate a first delay measurement process configured for use in the first network domain; causing the one or more network processors to send to the second node a delay measurement request configured to initiate a second delay measurement process configured for use in the second network domain; determining a delay measurement in the second network domain between the gateway node and the second node using the second delay measurement process; and using the delay measurement in the second network domain, causing the one or more network processors to send to the first node an end-to-end delay measurement response that enables the first node to compute the end-to-end delay.

In some aspects, the techniques described herein relate to an apparatus, wherein the first network type is a packet network and the second network type is an Optical Transport Network (OTN), and wherein the end-to-end delay measurement request is a forward probe packet and the end-to-end delay measurement response is a return probe packet.

In some aspects, the techniques described herein relate to an apparatus, wherein the control processor is further configured to perform operations including: computing a proxied time of arrival representing arrival of the end-to-end delay measurement request at the second node based on the delay measurement in the second network domain; computing a proxied time of transmission representing transmission of the end-to-end delay measurement response by the second node to the first node based on the delay measurement in the second network domain; and including the proxied time of arrival and the proxied time of transmission in the end-to-end delay measurement response sent to the first node.

In some aspects, the techniques described herein relate to an apparatus, wherein the control processor is configured to cause the one or more network processors to send to the second node the delay measurement request by sending a forward OTN frame in which a delay measurement bit in an overhead area of the forward OTN frame is toggled, and the control processor is configured to perform determining the delay measurement in the second network domain by measuring an interval of time between sending the forward OTN frame to the second node and receiving a return OTN frame from the second node in which the delay measurement bit has been toggled.

In some aspects, the techniques described herein relate to an apparatus, wherein the first network type is an Optical Transport Network (OTN) and the second network type is a packet network, wherein the end-to-end delay measurement request is a forward OTN frame in which a delay measurement bit is toggled in an overhead area of the forward OTN frame.

In some aspects, the techniques described herein relate to an apparatus, wherein the control processor is configured to perform: causing the one or more network processors to send the delay measurement request by sending a probe request packet; determining the delay measurement in the second network domain by determining a two-way delay in the packet network between the gateway node and the second node based on time of transmission of the probe request packet and time of arrival of a probe response packet from the second node; and using the delay measurement in the second network domain for sending the end-to-end delay measurement response including delaying, by an amount of time based on the two-way delay in the packet network, sending to the first node of a return OTN frame in which a delay measurement bit is toggled in the overhead area of the return OTN frame.

In some aspects, the techniques described herein relate to an apparatus, wherein the forward OTN frame received at the gateway node in which the delay measurement bit is toggled to serve as the end-to-end delay measurement request is a first forward OTN frame, and when a timeout occurs by which the return OTN frame is to be sent to the first node in response to the first forward OTN frame before the two-way delay in the packet network is determined, the control processor is configured to perform sending of the return OTN frame in response to receiving by the gateway node of a subsequent forward OTN frame with the delay measurement bit toggled from the first node.

In some aspects, the techniques described herein relate to an apparatus, wherein the control processor is configured to continuously cause the one or more network processors to send to the second node the probe request packet and receive the probe response packet from the second node to determine the delay measurement in the second network domain, wherein the control processor causes the one or more network processors to send to the first node the return OTN frame in response to one or more network processors receiving the first forward OTN frame, prior to the timeout, when the delay measurement in the second network domain is available at the gateway node.

In some aspects, the techniques described herein relate to one or more non-transitory computer readable storage media encoded with instructions that, when executed by a control processor in a gateway node, causes the gateway node to perform operations for measuring end-to-end delay between a first node and a second node in a hybrid network environment that includes a first network domain of a first network type and a second network domain of a second network type, the first node being a part of the first network domain and the second node being a part of the second network domain, the operations including: obtaining an end-to-end delay measurement request sent by the first node to measure end-to-end delay between the first node and the second node, the end-to-end delay measurement request configured to initiate a first delay measurement process configured for use in the first network domain; causing to be sent to the second node a delay measurement request configured to initiate a second delay measurement process configured for use in the second network domain; determining a delay measurement in the second network domain between the gateway node and the second node using the second delay measurement process; and using the delay measurement in the second network domain, causing to be sent to the first node an end-to-end delay measurement response that enables the first node to compute the end-to-end delay.

In some aspects, the techniques described herein relate to one or more non-transitory computer readable storage media, wherein the first network type is a packet network and the second network type is an Optical Transport Network (OTN), and wherein the end-to-end delay measurement request is a forward probe packet and the end-to-end delay measurement response is a return probe packet, wherein the instructions further cause the control processor to perform operations including: computing a proxied time of arrival representing arrival of the end-to-end delay measurement request at the second node based on the delay measurement in the second network domain; computing a proxied time of transmission representing transmission of the end-to-end delay measurement response by the second node to the first node based on the delay measurement in the second network domain; and including the proxied time of arrival and the proxied time of transmission in the end-to-end delay measurement response sent to the first node.

In some aspects, the techniques described herein relate to one or more non-transitory computer readable storage media, wherein the first network type is an Optical Transport Network (OTN) and the second network type is a packet network, wherein the end-to-end delay measurement request is a forward OTN frame in which a delay measurement bit is toggled in an overhead area of the forward OTN frame, wherein the instructions further cause the control processor to perform operations including: causing to be sent to the second node the delay measurement request as a probe request packet; determining the delay measurement in the second network domain by determining a two-way delay in the packet network between the gateway node and the second node based on time of transmission of the probe request packet and time of arrival of a probe response packet from the second node; and using the delay measurement in the second network domain for sending the end-to-end delay measurement response including delaying, by an amount of time based on the two-way delay in the packet network, sending to the first node of a return OTN frame in which a delay measurement bit is toggled in the overhead area of the return OTN frame.

In some aspects, the techniques described herein relate to one or more non-transitory computer readable storage media, wherein the forward OTN frame received at the gateway node in which the delay measurement bit is toggled to serve as the end-to-end delay measurement request is a first forward OTN frame, and when a timeout occurs by which the return OTN frame is to be sent to the first node in response to the first forward OTN frame before the two-way delay in the packet network is determined, the instructions cause the control processor to cause sending of the return OTN frame in response to receiving by the gateway node of a subsequent forward OTN frame with the delay measurement bit toggled from the first node.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc., as discussed for various embodiments described herein may be performed among entities that may directly or indirectly connected utilizing any algorithms, communication protocols, interfaces, etc., (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method for measuring end-to-end delay between a first node and a second node in a hybrid network environment that includes a first network domain of a first network type and a second network domain of a second network type, the first node being a part of the first network domain and the second node being a part of the second network domain, the method performed by a gateway node that is at a boundary of the first network domain and the second network domain, the method comprising:
   receiving an end-to-end delay measurement request sent by the first node to measure end-to-end delay between the first node and the second node, the end-to-end delay measurement request configured to initiate a first delay measurement process configured for use in the first network domain;
   sending to the second node a delay measurement request configured to initiate a second delay measurement process configured for use in the second network domain;
   determining a delay measurement in the second network domain between the gateway node and the second node using the second delay measurement process; and
   using the delay measurement in the second network domain, sending to the first node an end-to-end delay measurement response that enables the first node to compute the end-to-end delay.

2. The method of claim 1, wherein the first network type is a packet network and the second network type is an Optical Transport Network (OTN), and wherein the end-to-end delay measurement request is a forward probe packet and the end-to-end delay measurement response is a return probe packet.

3. The method of claim 2, further comprising:
   computing a proxied time of arrival representing arrival of the end-to-end delay measurement request at the second node based on the delay measurement in the second network domain;
   computing a proxied time of transmission representing transmission of the end-to-end delay measurement response by the second node to the first node based on the delay measurement in the second network domain; and
   including the proxied time of arrival and the proxied time of transmission in the end-to-end delay measurement response sent to the first node.

4. The method of claim 3, wherein:
   sending to the second node the delay measurement request comprises sending a forward OTN frame in which a delay measurement bit in an overhead area of the forward OTN frame is toggled; and
   determining the delay measurement in the second network domain comprises measuring an interval of time between sending the forward OTN frame to the second node and receiving a return OTN frame from the second node in which the delay measurement bit has been toggled.

5. The method of claim 1, wherein the first network type is an Optical Transport Network (OTN) and the second network type is a packet network, wherein the end-to-end delay measurement request is a forward OTN frame in which a delay measurement bit is toggled in an overhead area of the forward OTN frame.

6. The method of claim 5, wherein:
   sending to the second node the delay measurement request comprises sending a probe request packet;
   determining the delay measurement in the second network domain comprises determining a two-way delay in the packet network between the gateway node and the second node based on time of transmission of the probe request packet and time of arrival of a probe response packet from the second node; and
   using the delay measurement in the second network domain for sending the end-to-end delay measurement response comprises delaying, by an amount of time based on the two-way delay in the packet network, sending to the first node of a return OTN frame in which a delay measurement bit is toggled in the overhead area of the return OTN frame.

7. The method of claim 6, wherein the forward OTN frame received at the gateway node in which the delay measurement bit is toggled to serve as the end-to-end delay measurement request is a first forward OTN frame, and when a timeout occurs by which the return OTN frame is to be sent to the first node in response to the first forward OTN frame before the two-way delay in the packet network is determined, sending of the return OTN frame is performed in response to receiving by the gateway node of a subsequent forward OTN frame with the delay measurement bit toggled from the first node.

8. The method of claim 7, further comprising:
   continuously performing sending to the second node the probe request packet and receiving the probe response packet from the second node to determine the delay measurement in the second network domain,
   wherein sending to the first node the return OTN frame is performed in response to receiving the first forward OTN frame, prior to the timeout, when the delay measurement in the second network domain is available at the gateway node based on the continuously performing.

9. An apparatus comprising:
   one or more network interfaces configured to enable network communication on behalf of a gateway node in a hybrid network environment that includes a first network domain of a first network type and a second network domain of a second network type, the gateway node being at a boundary of the first network domain and the second network domain;
   one or more network processors coupled to the one or more network interfaces to send and receive network communications in the first network domain and in the second network domain; and
   a control processor coupled to the one or more network processors, the control processor configured to perform operations including:
      obtain an end-to-end delay measurement request received by the one or more network processors that is sent by a first node in the first network domain to measure end-to-end delay between the first node and a second node in the second network domain, the end-to-end delay measurement request configured to initiate a first delay measurement process configured for use in the first network domain;
      causing the one or more network processors to send to the second node a delay measurement request configured to initiate a second delay measurement process configured for use in the second network domain;
      determining a delay measurement in the second network domain between the gateway node and the second node using the second delay measurement process; and using the delay measurement in the second network domain, causing the one or more network processors to send to the first node an end-to-end delay measurement response that enables the first node to compute the end-to-end delay.

10. The apparatus of claim 9, wherein the first network type is a packet network and the second network type is an Optical Transport Network (OTN), and wherein the end-to-end delay measurement request is a forward probe packet and the end-to-end delay measurement response is a return probe packet.

11. The apparatus of claim 10, wherein the control processor is further configured to perform operations including:
computing a proxied time of arrival representing arrival of the end-to-end delay measurement request at the second node based on the delay measurement in the second network domain;
computing a proxied time of transmission representing transmission of the end-to-end delay measurement response by the second node to the first node based on the delay measurement in the second network domain; and
including the proxied time of arrival and the proxied time of transmission in the end-to-end delay measurement response sent to the first node.

12. The apparatus of claim 11, wherein the control processor is configured to cause the one or more network processors to send to the second node the delay measurement request by sending a forward OTN frame in which a delay measurement bit in an overhead area of the forward OTN frame is toggled, and the control processor is configured to perform determining the delay measurement in the second network domain by measuring an interval of time between sending the forward OTN frame to the second node and receiving a return OTN frame from the second node in which the delay measurement bit has been toggled.

13. The apparatus of claim 9, wherein the first network type is an Optical Transport Network (OTN) and the second network type is a packet network, wherein the end-to-end delay measurement request is a forward OTN frame in which a delay measurement bit is toggled in an overhead area of the forward OTN frame.

14. The apparatus of claim 13, wherein the control processor is configured to perform:
causing the one or more network processors to send the delay measurement request by sending a probe request packet;
determining the delay measurement in the second network domain by determining a two-way delay in the packet network between the gateway node and the second node based on time of transmission of the probe request packet and time of arrival of a probe response packet from the second node; and
using the delay measurement in the second network domain for sending the end-to-end delay measurement response including delaying, by an amount of time based on the two-way delay in the packet network, sending to the first node of a return OTN frame in which a delay measurement bit is toggled in the overhead area of the return OTN frame.

15. The apparatus of claim 14, wherein the forward OTN frame received at the gateway node in which the delay measurement bit is toggled to serve as the end-to-end delay measurement request is a first forward OTN frame, and when a timeout occurs by which the return OTN frame is to be sent to the first node in response to the first forward OTN frame before the two-way delay in the packet network is determined, the control processor is configured to perform sending of the return OTN frame in response to receiving by the gateway node of a subsequent forward OTN frame with the delay measurement bit toggled from the first node.

16. The apparatus of claim 15, wherein the control processor is configured to continuously cause the one or more network processors to send to the second node the probe request packet and receive the probe response packet from the second node to determine the delay measurement in the second network domain, wherein the control processor causes the one or more network processors to send to the first node the return OTN frame in response to one or more network processors receiving the first forward OTN frame, prior to the timeout, when the delay measurement in the second network domain is available at the gateway node.

17. One or more non-transitory computer readable storage media encoded with instructions that, when executed by a control processor in a gateway node, causes the gateway node to perform operations for measuring end-to-end delay between a first node and a second node in a hybrid network environment that includes a first network domain of a first network type and a second network domain of a second network type, the first node being a part of the first network domain and the second node being a part of the second network domain, the operations including:
obtaining an end-to-end delay measurement request sent by the first node to measure end-to-end delay between the first node and the second node, the end-to-end delay measurement request configured to initiate a first delay measurement process configured for use in the first network domain;
causing to be sent to the second node a delay measurement request configured to initiate a second delay measurement process configured for use in the second network domain;
determining a delay measurement in the second network domain between the gateway node and the second node using the second delay measurement process; and
using the delay measurement in the second network domain, causing to be sent to the first node an end-to-end delay measurement response that enables the first node to compute the end-to-end delay.

18. The one or more non-transitory computer readable storage media of claim 17, wherein the first network type is a packet network and the second network type is an Optical Transport Network (OTN), and wherein the end-to-end delay measurement request is a forward probe packet and the end-to-end delay measurement response is a return probe packet, wherein the instructions further cause the control processor to perform operations including:
computing a proxied time of arrival representing arrival of the end-to-end delay measurement request at the second node based on the delay measurement in the second network domain;
computing a proxied time of transmission representing transmission of the end-to-end delay measurement response by the second node to the first node based on the delay measurement in the second network domain; and
including the proxied time of arrival and the proxied time of transmission in the end-to-end delay measurement response sent to the first node.

19. The one or more non-transitory computer readable storage media of claim 17, wherein the first network type is an Optical Transport Network (OTN) and the second network type is a packet network, wherein the end-to-end delay measurement request is a forward OTN frame in which a delay measurement bit is toggled in an overhead area of the forward OTN frame, wherein the instructions further cause the control processor to perform operations including:

causing to be sent to the second node the delay measurement request as a probe request packet;

determining the delay measurement in the second network domain by determining a two-way delay in the packet network between the gateway node and the second node based on time of transmission of the probe request packet and time of arrival of a probe response packet from the second node; and using the delay measurement in the second network domain for sending the end-to-end delay measurement response including delaying, by an amount of time based on the two-way delay in the packet network, sending to the first node of a return OTN frame in which a delay measurement bit is toggled in the overhead area of the return OTN frame.

20. The one or more non-transitory computer readable storage media of claim 19, wherein the forward OTN frame received at the gateway node in which the delay measurement bit is toggled to serve as the end-to-end delay measurement request is a first forward OTN frame, and when a timeout occurs by which the return OTN frame is to be sent to the first node in response to the first forward OTN frame before the two-way delay in the packet network is determined, the instructions cause the control processor to cause sending of the return OTN frame in response to receiving by the gateway node of a subsequent forward OTN frame with the delay measurement bit toggled from the first node.

\* \* \* \* \*